(12) United States Patent
Underhill

(10) Patent No.: US 7,377,093 B2
(45) Date of Patent: May 27, 2008

(54) ROTARY CROP INVERTER

(75) Inventor: Kenneth R. Underhill, Strasburg, PA (US)

(73) Assignee: CNH America LLC, New Holland, PA (US)

(*) Notice: Subject to any disclaimer, the term of this patent is extended or adjusted under 35 U.S.C. 154(b) by 0 days.

(21) Appl. No.: 11/253,306

(22) Filed: Oct. 19, 2005

(65) Prior Publication Data

US 2007/0084177 A1 Apr. 19, 2007

(51) Int. Cl.
*A01D 76/00* (2006.01)
*A01D 78/00* (2006.01)
*A01D 80/00* (2006.01)
*A01D 84/00* (2006.01)

(52) U.S. Cl. ..................................... 56/379

(58) Field of Classification Search ............... 56/377, 56/379, 370, 366, 376, 396, 399, 365
See application file for complete search history.

(56) References Cited

U.S. PATENT DOCUMENTS

| | | | |
|---|---|---|---|
| 3,527,040 A * | 9/1970 | Teagle | 56/370 |
| 3,555,800 A * | 1/1971 | Stoll | 56/370 |
| 3,735,573 A * | 5/1973 | Dziuba et al. | 56/370 |
| 3,962,854 A * | 6/1976 | van der Lely et al. | 56/370 |
| 4,144,699 A * | 3/1979 | Aron | 56/370 |
| 4,166,352 A * | 9/1979 | Knusting | 56/366 |
| 4,345,422 A * | 8/1982 | Amstutz | 56/370 |
| 4,366,666 A | 1/1983 | van der Lely et al. | |
| 4,730,477 A | 3/1988 | Fisher et al. | |
| 4,875,332 A * | 10/1989 | Aron | 56/377 |
| 4,914,901 A * | 4/1990 | Aron | 56/370 |
| 4,922,700 A * | 5/1990 | Aron | 56/370 |
| 5,024,053 A * | 6/1991 | Aron | 56/367 |
| 5,060,465 A * | 10/1991 | Jerome | 56/367 |
| 5,251,431 A | 10/1993 | Shoop | |
| 5,274,990 A * | 1/1994 | Aron et al. | 56/377 |
| 5,586,421 A * | 12/1996 | Aron | 56/367 |
| 5,862,659 A * | 1/1999 | Aron | 56/367 |
| 6,354,429 B2 | 3/2002 | Kuhlmann et al. | |
| 6,467,249 B2 * | 10/2002 | Demanet | 56/377 |

* cited by examiner

*Primary Examiner*—Árpád Fábián Kovács
(74) *Attorney, Agent, or Firm*—Patrick M. Sheldrake; John William Stader; Michael G. Harms

(57) ABSTRACT

The apparatus is a farm machine that inverts crop windrows using only the raking tines of a conventional rotary rake machine. The tines engage and move an existing windrow, and invert the windrow as the crop is being disengaged from the tines. The inverting machine accomplishes the inverting by imparting motion to the discharging crop that has a vector of motion that is in the same direction as the movement of the inverter machine. This causes the crop to move faster than the machine itself and inverts the windrow by pushing the disengaging crop over the crop that was previously discharged.

5 Claims, 4 Drawing Sheets

PRIOR ART

ROTARY CROP INVERTER

BACKGROUND OF THE INVENTION

This invention deals generally with farm machinery and more specifically with a rotary raking machine modified into a windrow inverting machine.

Prior art farm machines include distinct raking machines and windrow inverter machines. Raking machines pick up scattered crop and deposit it into a windrow, a long continuous pile of crop, and, at a later time, an inverter machine is used to turn the windrow over so that the previous bottom portion of the windrow will dry.

The typical rotary rake machine is pulled behind a tractor and includes an assembly of extending arms formed into a pinwheel-like configuration which revolves in a horizontal plane. Each arm holds a group of wire tines that extend to the ground during part of the revolution of the arm assembly. In order to form the windrow, the tines are oriented vertically down with their ends at the ground to perform the raking operation. Then the tines are lifted up to stop the raking action and permit the formation of the windrow.

The typical rake machine divides the two positions of the tines into approximate halves of the circle of revolution of the arms. The tines are down and dropping or lifting as they pass the front of the machine, at the portion of the circle nearest to the tractor, and are then up as they pass the part of the circle most remote from the tractor. This motion rakes the crop from one side of the crop rake, toward the tractor, and then pushes it to one side of the path, forming the windrow.

Prior art inverters are completely different from rotary rake machines in that they essentially continuously pick up the windrow, reorient it, and lay it back down on the ground. U.S. Pat. No. 4,730,447 by Fisher uses tines in a belt arrangement to lift crop up a ramp onto a disc shaped platform with a circumferential wall. A pinwheel type assembly then drives vertically oriented tines that move the crop around the platform until it is moving in the same direction of travel as the tractor where it is pushed over a downward curved edge and onto the ground.

U.S. Pat. No. 5,251,431 by Shoop uses a cylindrical type rake rotating on a horizontal axis to invert the crop while throwing it onto a tilted rotating disc from where it is propelled to the ground while the crop is oriented approximately at a right angle to the direction of movement of the tractor.

U.S. Pat. No. 6,354,429 by Kuhlmann discloses an inverter that uses a sloped conveyor belt to lift the windrow onto a curved conveyor and a discharge conveyor to convey the crop from the opposite side of the curved conveyor to a location where it is dropped to the ground while the crop is moving in the same direction as the tractor.

The Fisher and Kuhlmann machines accomplish the inverting by discharging the crop while the crop itself is moving so as to produce a greater speed differential between the crop and the ground than between the inverting machine and the ground. This makes the speed of the crop relative to the ground greater than that of the platform from which it is dropped and causes the inverting of the crop.

However, the prior art windrow inverters have a significant problem. They all require a complex machine completely different from the crop rake or at least an additional apparatus used with a crop rake machine to accomplish the inverting. This adds a significant investment to any farm machine manufacturing operation.

It would be very beneficial to construct an inverting machine that was based upon a rotary rake machine, because the cost of manufacture would be significantly reduced.

SUMMARY OF THE INVENTION

The present invention permits a simple modification of a rotary rake machine to convert it into a machine to invert windrows. The invention is a modification of a conventional rotary crop rake of the type that was previously described. Such a rotary rake machine is pulled behind a tractor and includes an assembly of extending arms formed into a configuration which revolves in a horizontal plane. Each arm holds a group of wire tines that extend to the ground during part of the revolution of the arm assembly. To form the windrow, as the machine moves over the crop, each arm is rotated on its axis to orient its tines vertically down with their ends at the ground to perform the raking operation. Then the arms are rotated to lift the tines up to approximately a horizontal orientation to stop the raking action and permit the formation of the windrow.

The present invention provides a relatively simple modification to such a machine to permit it to pick up a windrow and drop it to the ground while the rake tines, and therefore the crop, are moving in the same direction as the movement of the tractor. This produces an action for inverting a windrow, but does so with a machine similar to the type that is built to form the windrow and without the addition of other mechanisms such as conveyor belts or rotating tables which add dramatically to the machine's cost. This change in function is accomplished by changing, and approximately reversing, those portions of the circular path of the rake's tines during which the tines are on the ground and during which they are raised up.

The raking operation divides the two positions of the tines into approximate halves of the circle of revolution of the arms. During the raking operation the tines are down as they pass the front of the machine, at the portion of the raking circle nearest to the tractor. Then the tines are up as they pass the part of the circle most remote from the tractor. This motion rakes the crop and then pushes it to one side of the path, forming a windrow.

However, in the inverting machine of the present invention the action of the tines is modified so that the tines are down in the region of the rear of the inverter machine, the part of the rake machine most remote from the tractor. This seemingly minor change means that the tines engage the windrow, lift it, move it around the inverter machine, and then drop the crop from that side of the inverter machine where the tines are moving in the same direction as the inverter machine is moving. The surprising result is that, even without the addition of conveyors or rotating discs, as long as the motion of the crop as it leaves the tines has some vector of its movement in the direction of the motion of the inverting machine, the windrow is inverted. This is because when a first part of the windrow hits the ground, the following part of the windrow, which is traveling at the tine speed plus the inverter machine speed, is pulled over the previously discharged part of the windrow, thereby rolling the windrow over.

The modification to make a rotary rake machine into an inverter mode is accomplished relatively easily. In both machines, to move the tines up and down the holding arms on which the tines are mounted are rotated, and this rotation can be accomplished in numerous ways. In the preferred embodiment the rotation is caused by the structure of the arms.

Each arm has a crank arm structure on its end near the center of revolution of the arm assembly. That is, each tine holding arm has on its end a crank arm protruding perpendicular to the axis of the tine holding arm. Attached to the end of the crank arm is a cam follower. A cam, which is essentially a ring structure, is located at the center structure of the arm assembly and locked in place to prevent inadvertent rotation. As the arms and the outer portion of the arm assembly revolve around the center structure, the cam followers on the ends of the crank arms ride around on the cam, and the rotation of the arms is controlled by the cam. In the preferred embodiment of the invention, the crank arms are oriented in approximately the same plane as the tines. Thus, when the crank arms are horizontal the tines are up and also approximately horizontal, while when the tines are down and approximately vertical the crank arms are also vertical. The movement of the crank arms between the horizontal and vertical orientations is accomplished by the structure of the cam.

A portion of the circumference of the ring shaped cam is at the same height as the axes of the tine arms, so that when the cam followers are on that part of the cam the crank arms are in a horizontal orientation. The cam also has a region in which it rises to and remains at a height equal to the length of the crank arms, so that when the cam followers are on that high part of the cam, the crank arms are oriented vertically, orienting the tines vertically and placing them on the ground. The shape of the cam therefore determines the positions of the tines as the arm assembly revolves around the center of the rake machine.

The present invention for an inverter requires only that the location of the cam controlling the position of the tines be changed. For raking machines the high part of the cam has been located toward the front of the machine, the portion nearest to the tractor, but for the inverter machine the high part of the cam must be located mostly in the region near the rear of the machine, away from the tractor.

The present invention thereby furnishes an inverter machine that is similar in most respects to a rotary raking machine, however, the inverter is modified to change the location in the tine revolution path at which the windrow is released from the tines.

DETAILED DESCRIPTION OF THE INVENTION

Figure 1:
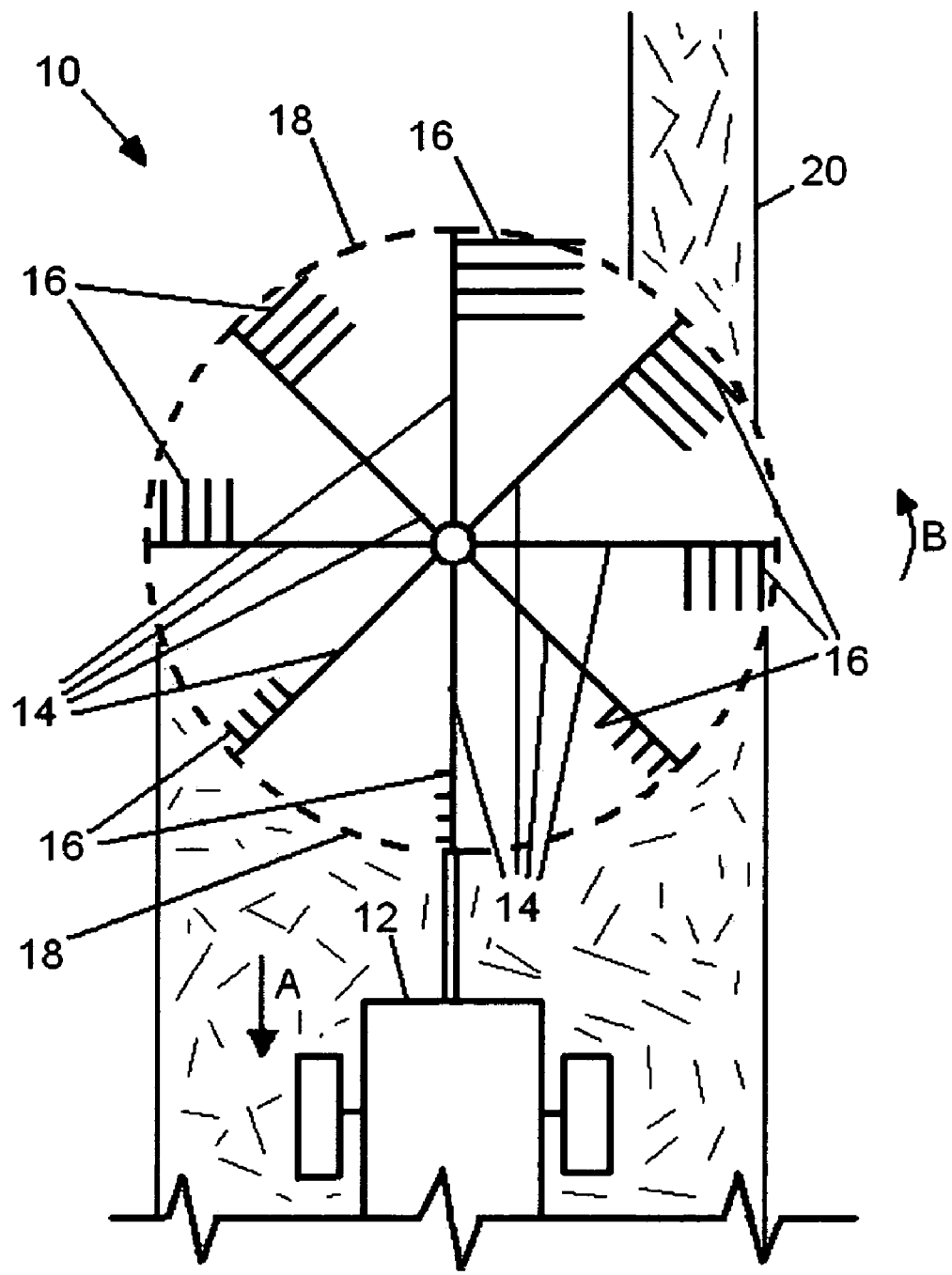
FIG. 1 is a schematic diagram of the top view of a prior art rotary rake machine showing the pattern of movement of the tines when raking crop.
Figure 3:
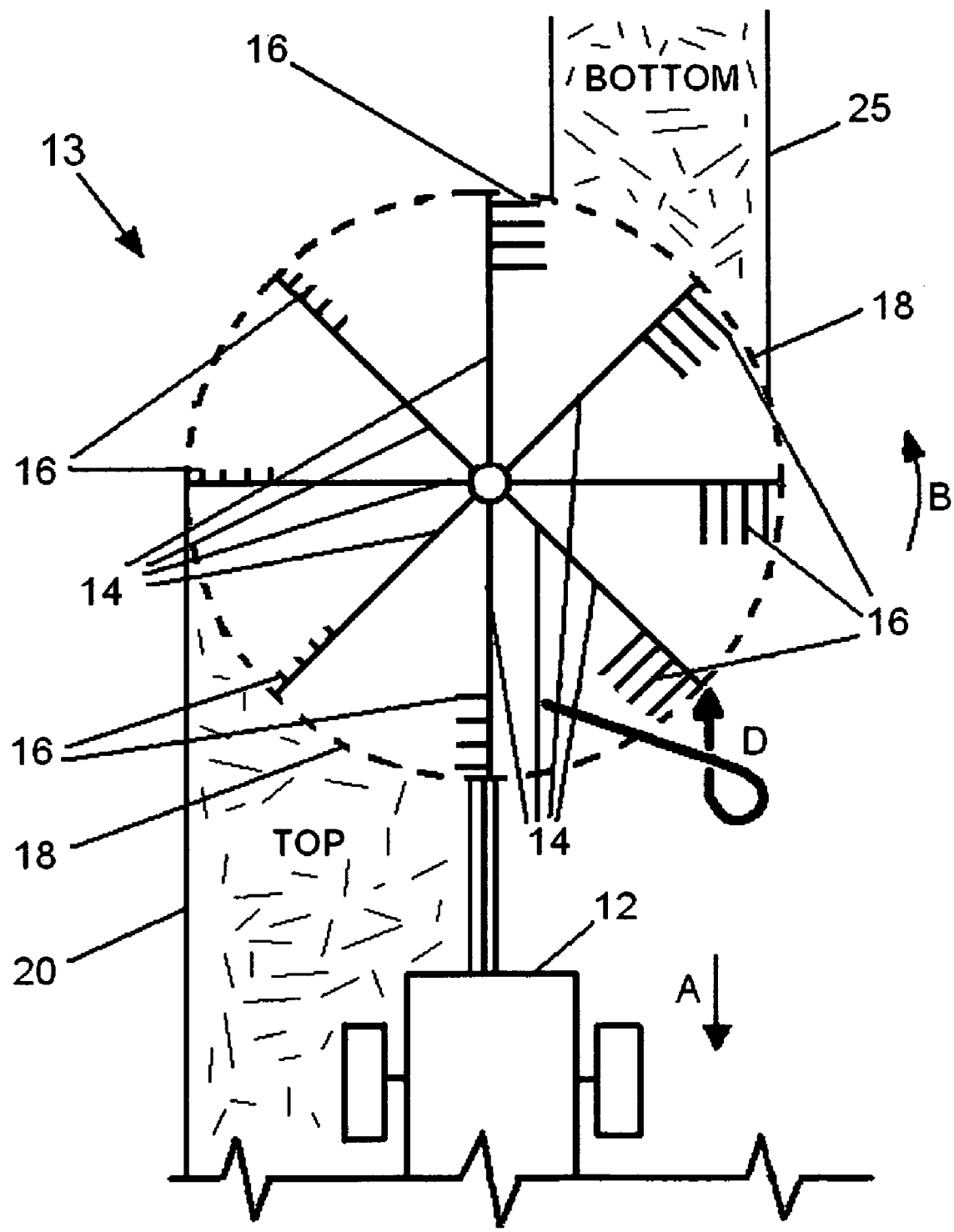
FIG. 3 is a schematic diagram of the top view of an alternate embodiment of the inverter machine of the invention showing a second pattern of movement of the tines for inverting.
Figure 4:
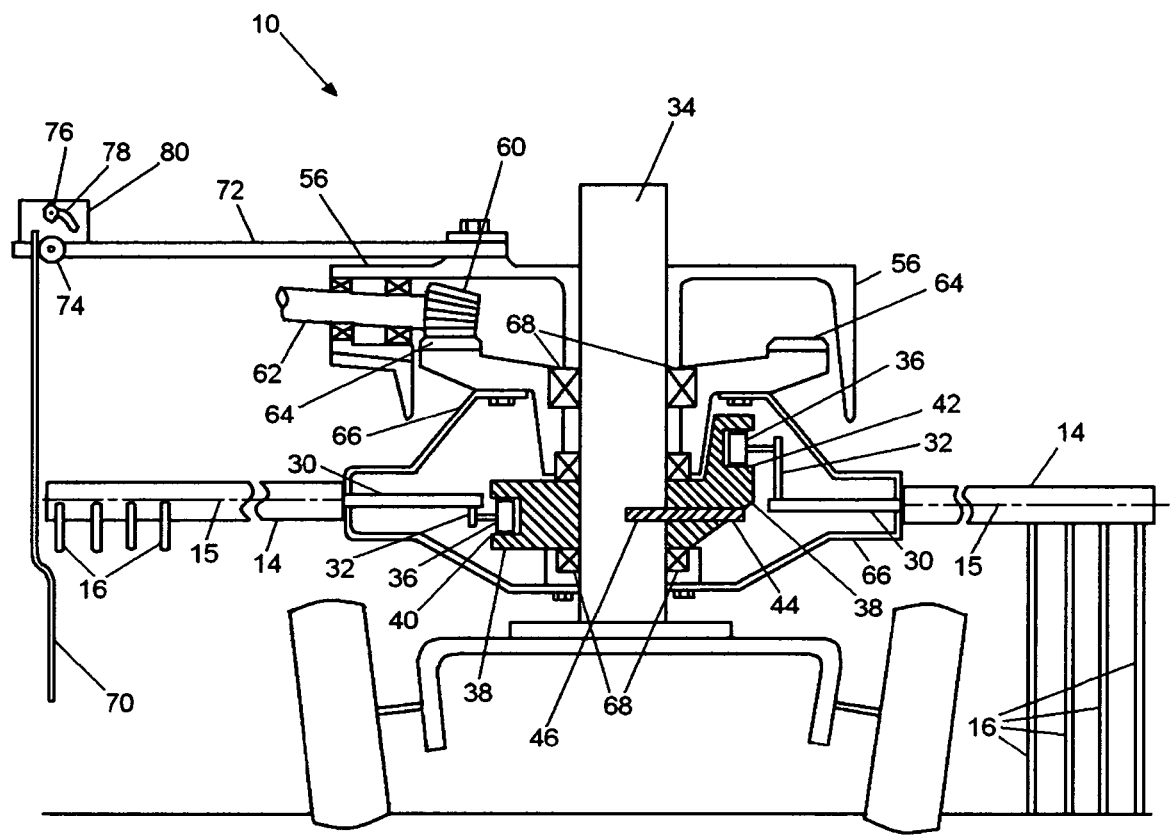
FIG. 4 is a schematic partial cross section side view of the common structure of a prior art rake machine and the inverter machines of the present invention.

FIG. 1 is a schematic diagram of the top view of a prior art rotary rake machine 10 showing the pattern of movement of tines 16 when such a rake machine is raking crop. The identifying numbers for the parts in FIGS. 2-4 are the same as those in FIG. 1 when the parts themselves are the same.

Rake machine 10 is connected to and pulled by tractor 12 that propels rake machine 10 in the direction indicated by arrow A, and rake machine 10 includes several revolving arms 14 that each hold sets of tines 16. The orientation of each set of tines 16 changes depending upon the location of its arm 14 within circle of revolution 18. It should be appreciated that, since FIGS. 1, 2 and 3 are top views, when tines 16 appear longest, they are in an approximately horizontal orientation and not engaging the crop on the ground, while when tines 16 appear shortest they are oriented approximately vertically and engaging the crop that is on the ground. Intermediate lengths of the tines indicate that they are changing their orientation between these two extremes.

As shown in FIG. 1, for raking, rake machine 10 moves the tines down to engage the crop as the arms revolve into the region of circle of revolution 18 nearest to the tractor. At that location, tines 16 contact the crop on the left side of FIG. 1, and the movement of the arms 14 and tines 16 rakes the crop from that side of rake machine 10, toward tractor 12, and then pushes the crop to one side of the tractor's path and releases the crop, forming windrow 20 on the right side of FIG. 1. This movement is based upon the counter clockwise revolution of arms 14 as indicated by arrow B, and the particular location of windrow 20 would be changed if the direction of revolution were changed.

Figure 2:
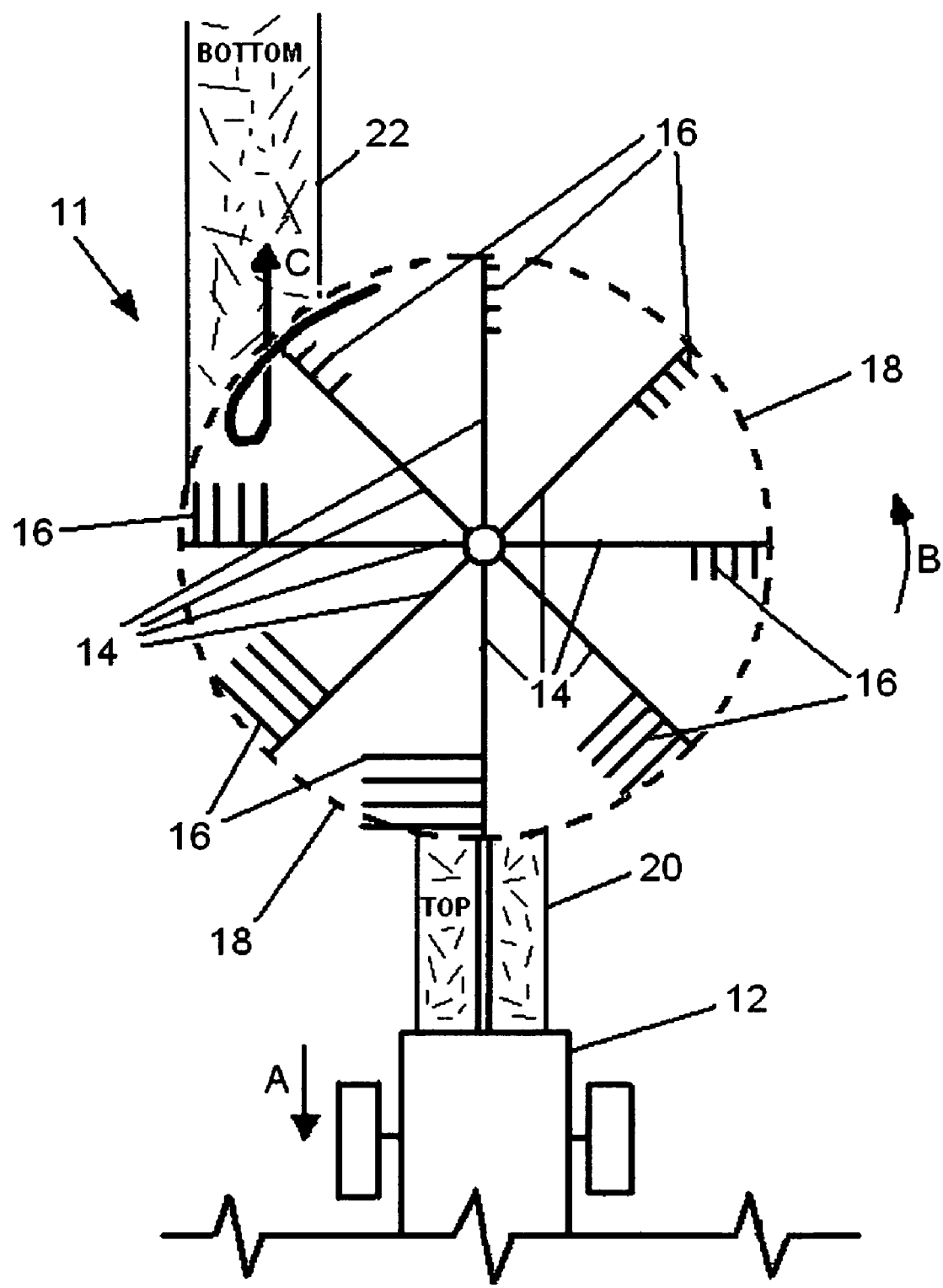
FIG. 2 is a schematic diagram of the top view of the preferred embodiment of the inverter machine of the invention showing a first pattern of movement of the tines for inverting.

FIG. 2 is a schematic diagram of the top view of the preferred embodiment of inverter machine 11. FIG. 2 shows one of several possible patterns of movement of tines 16 different from their pattern of movement in FIG. 1 because machine 11 is constructed for inverting windrows rather than for raking crop into windrows.

As shown in FIG. 2, for inverting windrows machine 11 moves the tines down to engage the crop as the arms revolve into the region of circle of revolution 18 farthest from the tractor. At that location, tines 16 contact original windrow 20, and the movement of arms 14 and tines 16 picks up and moves the crop from one side of inverter machine 11, and then drops the crop on the other side of the machine path, forming inverted windrow 22 on the left side of FIG. 2.

Dropping the crop from the opposite side of inverter machine 11 means that, when the windrow is disengaged, tines 16 are moving in the same direction that inverter machine 11 is moving. In the preferred embodiment of FIG. 2 the tines are set to release the crop when the tine driven crop is traveling almost fully in the same direction as inverter machine 11. Viewing circle of revolution 18 as a clock, FIG. 2 shows the tines lowering at approximately 3 o'clock and discharging the crop at approximately 9 o'clock. With such a disengagement position, the forward motion of the tine peripheral speed in combination with the machine ground speed causes the crop to be pulled over crop that was discharged just before it, thereby rolling over, or inverting, the windrow. It is the speed of the discharging crop relative to the ground that controls the inverting action. Thus, as indicated by the Top and Bottom labels in FIG. 2 and FIG. 3, the top surface of original windrow 20 ends up nearer to the ground and hidden from view in inverted windrow 22, while the bottom portion of original windrow 20 is seen at the top of inverted windrow 22. Arrow C in FIG. 2 shows the path traveled by the crop material as it is released from tines 16 as they are rotated upward. It should be appreciated that the width of windrow 20 is not a limitation on the effectiveness of the inverter machines of the invention since tines 16 can actually be down and set to engage the crop over a significant portion of circle of revolution 18.

FIG. 3 is a schematic diagram of the top view of an alternate embodiment of an inverter machine 13 of the invention showing a second pattern of movement of the tines that can be used for inverting. Inverter machine 13 of FIG. 3 differs from inverter machine 11 of FIG. 2 only in the locations on circle of rotation 18 in which the tines pick up original windrow 20 and discharge inverted windrow 25.

To successfully invert the windrow it is only necessary that when being discharged the crop have at least some forward vector component in its motion that is in the same direction as the forward motion of inverter machine 11. Even with such a minimal forward vector of motion as is shown by arrow D of FIG. 3, as the crop is released from the tines there is sufficient speed so that when a first part of the crop hits the ground the following crop is pulled over the crop that was previously discharged, and the windrow is inverted.

Thus, the only requirement for converting prior art rotary rake machine 10 into inverter machines 11 or 13 is to change the portions of circle of revolution 18 during which tines 16 are rotated into and out of contact with the crop. In the preferred embodiment of the invention this is accomplished by slightly modifying the structure that is common to both rotary rake machine 10 and inverter machines 11 and 13 of the invention.

FIG. 4 is a schematic partial cross section side view of the common structure of prior art rake machine 10 and inverter machines 11 and 13 of the present invention. In FIG. 4 only cam 38 is shown with crosshatching.

The modification of rake machine 10 of FIG. 1 to the inverter machines of FIGS. 2 and 3 is accomplished relatively simply. In both rake machines and the inverter machines of the present invention the raising and lowering of tines 16 can be accomplished in the same manner. One such tine moving structure is shown in FIG. 4 with each holding arm 14 on which tines 16 are mounted rotated on its length axis 15. This rotation is implemented by the structure of arms 14. Each arm 14 has an extension 30 with a crank arm 32 attached on the end of extension 30 that is nearest axle 34 around which arms 14 revolve. Crank arm 32 is oriented perpendicular to axis 15 of arm 14, and cam follower 36 is attached to the end of crank arm 32.

Cam followers 36 are installed on cam 38, which is a ring structure surrounding and concentric with axle 34. As arms 14 are moved around center axle 34 and cam 38, cam followers 36 on the ends of crank arms 32 ride around on cam 38, and the rotation of arms 14 is controlled by cam 38. In the preferred embodiment of the invention, the crank arms are oriented in approximately the same plane as the tines. Thus, when crank arms 32 are horizontal, tines 16 are up and also approximately horizontal, while tines 16 are down and approximately vertical when crank arms 32 are vertical. This orientation in the same plane is not required for operation of the invention, but it is a simple arrangement to facilitate understanding of the operation.

The pattern of movement of crank arms 32 between the horizontal and vertical orientations is accomplished by the structure of cam 38. A low region 40 of the circumference of cam 38 is at approximately the same height as axes 15 of arms 14, so that when cam followers 36 are on low region 40 of cam 38, crank arms 32 are in a horizontal orientation. Cam 38 also has a high region 42 in which it rises to and remains at a height approximately equal to the length of crank arms 32. In high region 42 crank arms 32 are oriented vertically and tines 16 are also approximately vertical and engaging crop on the ground. The shape of cam 38 therefore determines the positions of tines 16 as arms 14 revolve around axle 34 of rake machine 10.

The present invention changes the orientation of cam 38 on axle 34 to change the regions of the circle of revolution of arms 14 in which the tines are up or down so that rake machine 10 (FIG. 1) is modified into inverter machines 11 and 13 (FIGS. 2 and 3).

In the prior art rake machine, high portion 42 of cam 38 had been located toward the front of rake 10, the part of machine 10 nearest to the tractor. For purposes of explaining the operation, it is assumed that in FIG. 4 the machine is moving toward the viewer and the rotation of arms 14 is counter clockwise as shown in FIGS. 1-3. That means for raking machine 10 of FIG. 1, in FIG. 4 high portion 42 of cam 38 is at the end of the high part of the rotation and the unseen balance of high portion 42 is toward the front of rake machine 10. Using the same assumptions of movement of the machines, on inverter machines 11 and 13 high portion 42 of cam 38 is located near the rear of the machines, away from the tractor.

This simple change of the location within circle of revolution 18 in which tines 16 are engaging the crop is all that is required to modify a rotary rake machine into an inverter machine, and it can be accomplished structurally in many ways regardless of the particular construction of the rotary rake machine. In the preferred embodiment, based on the use of ring type cam 38 with high portion 42 to control the tines, it is only necessary to lock cam 38 onto axle 34 at a different orientation. Cam 38 can be attached to axle 34 by any conventional device, including integrating the two parts into a single piece. FIG. 4 shows pin 44 as a simple attachment device. In a structure such as that shown in FIG. 4, it would only be necessary to form hole 46 at a different location on axle 34 to build inverter machines 11 or 13 rather than rake machine 10.

FIG. 4 shows the mechanism that supplies power to revolve arms 14. Drive gear 60 is rotated by shaft 62 which is driven by the power take-off (not shown) of tractor 12. Drive gear 60 engages and turns ring gear 64 that is structurally attached to arm assembly frame 66 which revolves around axle 34. Arms 14 are all mounted upon frame 66. Bearing 68 is one of several such bearings (all indicated by an enclosed "X") which facilitate movement between the concentric structures of machine frame 66 and ring gear 64 that surround axle 34.

FIG. 4 also shows another structure that adds versatility to the process of inverting the windrows. Limiting shield 70 is attached to frame 56 by means of support arm 72, and is located in the region where the lifted windrow is being dropped from the tines. Limiting shield 70 extends vertically downward from support arm 72 and includes a curve to offset it toward the center of inverter 10. Limiting shield 70 operates to restrict sideward movement of the crop as it is discharging from tines 16. At high speeds limiting shield 70 permits either maintaining a windrow configuration when the shield is in service or spreading out the crop for further drying when the shield is out of service. Limiting shield 70 is attached to support arm 72 by pivot 74, and it can be taken out of service by simply pulling its lower end up after unlocking bolt 76. Bolt 76 rides within curved slot 78 in bracket 80 and can be locked in either the raised or lowered positions.

The inverter machine of the invention can thus be constructed with only minor changes to any prior art rotary rake machine, thereby virtually eliminating the need for two separate production facilities for two completely different machines.

It should be appreciated that although the preferred embodiment described herein uses a particular mechanism for controlling the rotation of the tines, the present invention can actually be used with any mechanism that controls the raising and lowering of the tines, because the present invention merely changes the portions in the circle of revolution during which the tines are engaging the crop.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, the exact regions in which tines 16 engage the windrows can be changed, and the specific means by which arms 14 are revolved can also be changed. Furthermore, more or fewer arms 14 can rotate around axle 34.

What is claimed as new and for which Letters Patent of the United States are desired to be secured is:

1. A farm machine for inverting crop windrows comprising:
    an arm assembly which revolves in a horizontal plane around an axle affixed to the farm machine;
    arms attached to the arm assembly and extending from the axle;
    raking tines attached to each arm, the tines having a peripheral velocity due to revolution of the arm assembly, and as the farm machine moves over a windrow with a machine direction and a machine speed, engage crop on the ground at a first location on the arm assembly's revolution path and discharge the crop at a second location on the arm assembly's revolution path; and
    a tine control apparatus that determines the position of the first and second locations on the arm assembly's revolution path so that the tines engage and move a windrow, and as the tines discharge the crop, the crop is inverted from its previous condition;
    wherein the tine control apparatus positions the second location on the arm assembly's revolution path so that a component of the tine peripheral velocity parallel to the direction of travel is substantially in the same direction as the machine direction when the crop is being disengaged from the tines.

2. The farm machine of claim 1 wherein the tine control apparatus comprises:
    a cam attached to the axle with the cam forming a ring around the axle and including a higher portion and a lower portion;
    a cam follower interconnected with each arm with the cam follower held in contact with the cam; and
    a crank arm interconnecting each cam follower to its arm and causing the arm to rotate and also rotate the tines and cause the tines to engage and disengage from the crop as the cam follower moves between the higher and lower portions of the cam as the arms rotate around the axle.

3. The farm machine of claim 1 further including a limiting shield attached to the farm machine in a location outside the path of the arms with the location of the shield restricting sideward motion of crop being disengaged from the tines.

4. The farm machine of claim 1 further including a limiting shield attached to the farm machine in a location outside the path of the arms with the location of the shield restricting sideward motion of crop being disengaged from the tines, and with the shield mounted so that it can also be moved to a position which does not restrict the motion of the crop.

5. A farm machine for inverting crop windrows, said machine capable of being moved by an agricultural vehicle at a machine speed, said farm machine comprising:
    an arm assembly which revolves in a horizontal plane around an axle affixed to said farm machine; arms attached to the arm assembly and extending from the axle;
    raking tines attached to each arm having a peripheral velocity due to revolution of the arm assembly that, as the farm machine moves over a windrow, engage crop on the ground at a first location on the arm assembly's revolution path and discharge the crop at a second location on the arm assembly's revolution path; and
    a tine control apparatus that determines the position of the first and second locations on the arm assembly's revolution path so that the tines engage and move a windrow, and as the tines discharge the crop, the crop is inverted from its previous condition;
    wherein a component of the tine peripheral velocity parallel to the direction of travel is generally the same direction as the movement of the vehicle moving the farm machine when the crop is discharged from the tines.

* * * * *